May 25, 1965    E. A. BENDER    3,185,508
WEDGE SEAL COUPLING
Filed Aug. 24, 1961    2 Sheets-Sheet 2
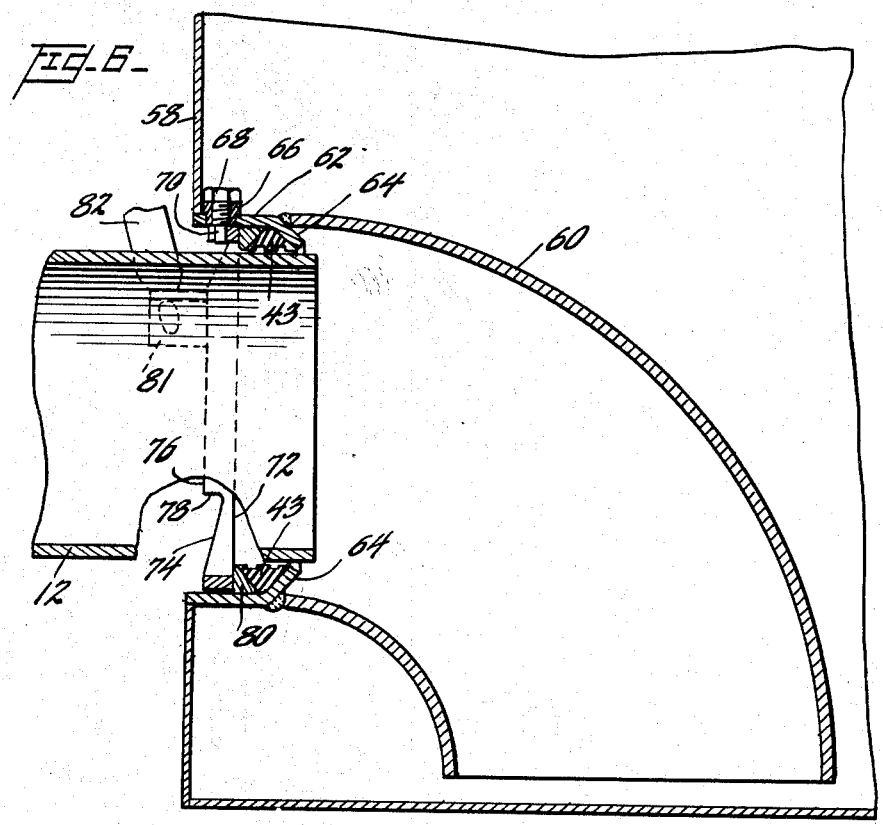
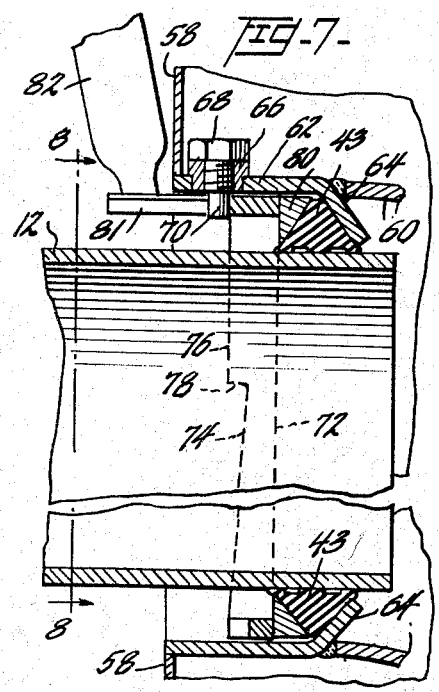
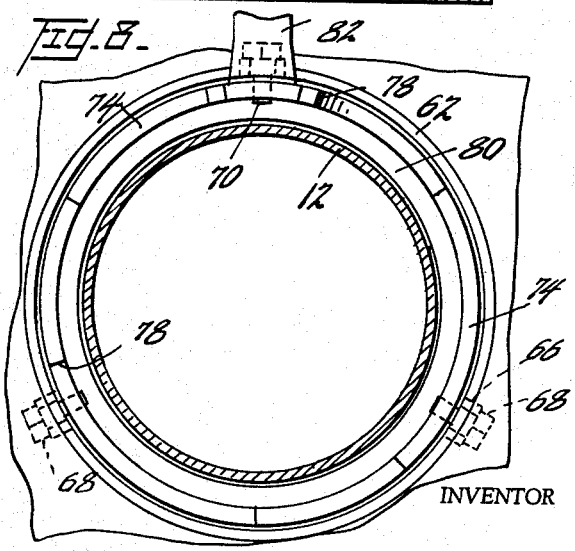
INVENTOR
Emil A. Bender,
BY Parker and Welsh
ATTORNEYS

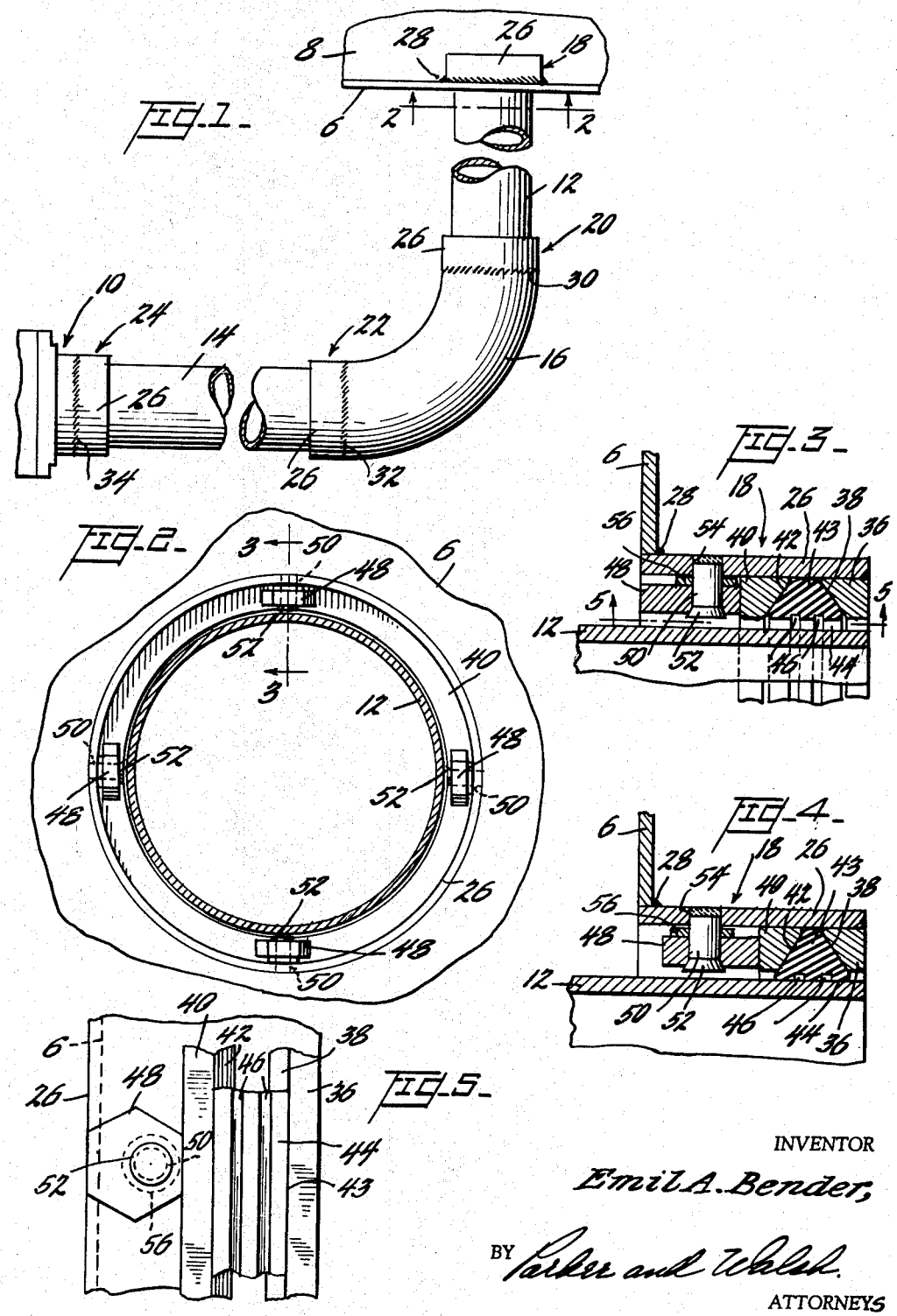

United States Patent Office 3,185,508
Patented May 25, 1965

3,185,508
WEDGE SEAL COUPLING
Emil A. Bender, P.O. Box 52, Bakersfield, Calif.
Filed Aug. 24, 1961, Ser. No. 133,722
2 Claims. (Cl. 285—341)

This application is a continuation-in-part of my pending application Serial No. 11,025 for Wedge Seal Coupling, which was filed on February 25, 1960.

The invention herein relates to fluid pipe lines in general, and in particular to a resilient seal for couplings in such lines. In the oil fields the drilling operations entail an extensive and complex arrangement of fluid lines which require frequent modification and disassembly as well as a high degree of flexibility. In order to meet these conditions while maintaining an effective fluid seal at the joints it has been necessary to depart radically from standard plumbing practice. For instance, the several components of a pipeline, including elbows, have been provided as simple, telescoping, slip connections, sealed off by an annular resilient member deformed so as to spread radially outwardly and inwardly into intimate contact with the cooperating surfaces of the mating parts.

In particular, one proposed form of sealant includes an inflatable pneumatic tube housed in an annular bulge on the female part of the coupling and adapted to expand against the outer surface of the male part. This female part may be on an elbow, a straight pipe section or on some part of the system, such as a mud tank. The pneumatic tube type has shortcomings, however, principally in the matter of undue bulk. This is particularly true of a connection at a main body, such as the mud tank, and in point of fact it has been considered advisable to provide a recess in the tank wall so that the attached, pneumatic tube housing will not protrude. Obviously this involves extra welding operations and undue expense and complexity.

By the present invention, I have contrived to overcome the aforesaid difficulties while not only maintaining but actually improving the merits of the quick-connect, resilient seal coupling.

It is therefore an object of the present invention to provide a slip-connection coupling for pipelines with resilient seal which does not entail appreciable added bulk or undue enlargement of profile of the system.

Other objects are to provide a resilient coupler which is dependable, low in cost, easy of manipulation, efficient in operation and possessed of long life.

These and other objects are attained by the present invention, which may be described in brief as a solid resilient ring between telescoping pipe sections radially expanded into sealing contact with the parts by cam-induced wedge action applied longitudinally of the piping.

For a more detailed description of the invention reference is made to the following specification, as illustrated in the accompanying drawings, in which:

FIGURE 1 is a top plan view of a typical pipe layout, with four resilient couplings and including an elbow section;

FIGURE 2 is an enlarged view of a section taken along the line 2—2 of FIGURE 1;

FIGURE 3 is an enlarged view of a section taken along the line 3—3 of FIGURE 2;

FIGURE 4 is a view similar to FIGURE 3 showing the positions of the parts after application of the wedging action;

FIGURE 5 is a sectional view taken along the line 5—5 of FIGURE 3;

FIGURE 6 is an axial sectional view through the inlet pipe of a tank, showing a resilient coupling with a modified cam arrangement, with the parts in position just prior to sealing;

FIGURE 7 is a view similar to FIGURE 6, showing the parts in the position they occupy after sealing; and FIGURE 8 is a sectional view through the inlet pipe, taken on the line 8—8 of FIGURE 7, and showing the coupling elements in end elevation.

Referring now to the drawings by characters of reference, there is shown in FIGURE 1 a portion of a pipe layout for an oil-drilling operation, in which 6 is the side wall and 8 the bottom, respectively, of a drilling mud tank which is served by a pump, a fragment of which is indicated by the numeral 10. The connecting pipeline between the tank and the pump comprises two straight pipe sections 12 and 14, respectively, and an elbow 16. The system contains four coupling units, namely, 18 welded to the tank wall 6, 20 and 22 welded to opposite ends of the elbow 16, and 24 welded to the pump unit 10.

As seen in the detailed showing of coupling 18, each coupling comprises an outer, tubular sleeve 26. In the case of coupling 18, this outer sleeve is received in a circular opening in wall 6 of the tank such that its outer rim is flush with the tank wall, and is secured in fluid-sealed relation by a circumferential weld 28, whereas the couplings 20, 22 and 24 are secured to their associated parts, in abutting relation, by welds 30, 32 and 34. Each sleeve 26 carries at one end an internal, annular metal ring 36, secured to the sleeve as by welding and having an inner, slant side 38. An associated metal ring 40, slidable in the sleeve 26, has an inner side 42 slanted in a sense opposite to that of slant side 38 of the fixed ring 36. Between rings 36 and 40 is a solid resilient, sealing element 43 of rubbery material having a band-shaped inner face 44 which in the normal, unstressed state of the seal is slightly spaced from the outer face of male pipe section 12. The sealing element, of generally triangular cross-section, has slanted side faces generally parallel to slant faces 38, 42 of the ring members, and it will be seen that movement of ring 40 toward ring 36 will result in a wedging action, deforming the seal radially inwardly into intimate pressure contact with male pipe section 12. Annular channels 46 in the inner face of the sealing ring provide a labyrinth which improves the efficiency of the seal.

The force producing the wedging action on the sealing ring is provided by a cam arrangement as follows: Spaced 90° part on a circle within the coupler sleeve 26 are four hexagonal cams 48, each eccentrically pivoted on a pin 50 with flared head 52 and secured by welding or other suitable means in bores 54 in sleeve 26. Due to the flat under face of cam 48 and the curved inner surface of sleeve 26, a spacer such as the washer 56 is provided. In the positions of the parts shown in FIGURES 3 and 5 the side of the hexagon radially nearest the axis of pin 50 is engaging the sliding ring 40. In this position the sealing ring is undeformed and the pipe sections may be readily joined or separated. Turning of the hex cam, either to the right or left by means of a wrench, will result in forcing ring 40 toward fixed ring 36 and deformation of the sealing ring, the degree of pressure depending upon whether the cam is turned to bring one, two or three of its flat sides into successive engagement with ring 40.

The hex cam is highly useful and efficient, not only providing a positive self-locking cam, but allowing for manipulation by "feel," and being operable in either direction. The cams are easily fabricated from hex bar stock. In addition, the entire sealing assembly is compact in the extreme and simple of design, an outstanding feature being that all of the structural elements are contained within a relatively narrow region between tubular male and female pipe sections, with the result that the pipe system appears little different from a conventional layout with threaded connections.

It will be understood that the coupling sleeve 26 will be attached to a pipe or other element of a system in such manner that the end containing the hex cam is outward for access by the wrench. For example, in FIGURE 1, the end of coupler 18 containing the hex cam is attached to the tank wall 6, whereas in the case of couplers 20, 22 and 24 the weld attachment is made on the end containing the fixed ring 36. This reversibility of identical couplers is another feature of the invention.

As an advantage over the pneumatic tube, my invention obviates failure due to leaks in the resilient sealing member itself.

Generally speaking, my invention provides advantages in operations peculiar to well-drilling layouts, in that quick and numerous connections may be made without attention to burdensome details of size, alignment and fit, and the flexibility of the resultant assembly also reduces the harmful effects of shock and vibration.

In the modified form of the invention shown in FIGURES 6 to 8, the camming action is provided by a pressure ring with a radially extending operating lever, and having a plurality of tapered slots in one end edge cooperating with a fixed pin to slide the ring axially and produce the wedging action. As seen in FIGURES 6 and 7, the tank 58 has an inner, inlet pipe 60 of gooseneck form, with downwardly disposed end opening. In lieu of the end abutment ring 36 welded to the inlet pipe in the form of device shown in FIGURES 1 to 5, the entering end of inlet pipe 60 has a welded extension 62, secured in the opening in the tank wall, and having an inwardly tapering, or frusto-conical skirt 64 on its inner end, which may be formed in any convenient manner, as by swaging, spinning, or straight die pressure. This skirt portion 64 serves as a backstop for the sealing ring 43, carried on the coupling pipe 12.

The extension 62 has a series of three circumferentially disposed bores with 120° spacing, in which are fixed the plugs 66, having threaded axial bores receiving the three cap screws 68, the latter having reduced, cylindrical outer ends or shanks 70, which extend inwardly of the extension 62, and serve as reaction members to take the thrust of the cam ring 72, which latter is received in nesting relation within the pipe extension 62. For cooperative action with the shank pins 70, the ring 72 has a series of three, slant notches 74, tapering from the outer edge 76 of the ring to an abrupt, terminal shoulder 78. The movable wedge ring 80, is identical in function with ring 40 of FIGURES 3 and 4, in that it is moved axially by cam action, to compress the sealing ring 43.

To provide lever action for manually turning the cam ring 72, the latter has a leg in the form of an arcuate segment 81 extending from one of its outer end edges 76, and to this leg is secured, as by welding, a generally radially disposed handle 82, which is preferably slanted somewhat to the radial direction to provide hand clearance between the handle and the tank.

With the parts in the unsealed position, as shown in FIGURE 6, the pin shanks 70 are at the innermost part of slots 74, in the general vicinity of shoulders 78. The sealing action is quite rapidly accomplished by a simple pull on the handle 82, which turns cam ring 72, the latter moving inwardly along pipe section 62 in response to the wedging action of tapered slots 74 against pin shanks 70, and carrying with it the wedge ring 80, which compresses the sealing ring 43.

While certain, preferred embodiments of the invention have been shown and described, it should not be deemed as limited thereby, but, in view of possible modifications and reasonable equivalents, only as shall appear from the spirit and scope of the appended claims.

I claim:

1. A pipe coupling comprising a tubular sleeve, a tubular insert received concentrically within said sleeve with substantial clearance between said insert and said sleeve, a first ring inwardly secured within said sleeve and radially spaced from said insert, a second ring slidably received in said sleeve, said rings having opposed, slant faces which diverge progressively along lines extending radially inwardly of said sleeve, a solid resilient ring of rubbery material located between said rings and having slant faces complementary to the slant faces of said first and second rings, whereby to be deformed radially inwardly upon approach of said second ring to said first ring, at least two radially inwardly extending pins secured to said sleeve and disposed symmetrically thereabout, a cam eccentrically pivoted on each pin, and having a plurality of self-locking faces adapted to contact said second ring, said cams lying wholly within said sleeve, between said sleeve and insert, one of said faces in contact with said ring when said resilient ring is either deformed or undeformed, said cams being located on one end, said sleeve to permit ready access of operating means for said cams for selective engagement of said self-locking faces with said second ring.

2. The device of claim 1 wherein said second ring is spaced circumferentially from said insert, and said resilient ring is spaced circumferentially from said insert when undeformed.

References Cited by the Examiner
UNITED STATES PATENTS

| | | | |
|---|---|---|---|
| 736,624 | 8/03 | Pitkethly et al. | 285—358 X |
| 771,388 | 10/04 | Nusbaum | 285—358 |
| 915,956 | 3/09 | Hazlet et al. | 285—341 |
| 964,270 | 7/10 | Joyce | 285—160 |
| 982,473 | 1/11 | Canedy | 285—396 |
| 1,194,236 | 8/16 | Richards | 285—302 |
| 1,288,042 | 12/18 | Kuhlman | 285—8 |
| 2,594,458 | 4/52 | La Briere | 285—338 X |
| 2,931,671 | 4/60 | Beeley | 285—341 X |
| 3,082,606 | 3/63 | Calciano | 285—338 X |

FOREIGN PATENTS

| | | |
|---|---|---|
| 142,620 | 7/51 | Australia. |
| 619,303 | 3/49 | Great Britain. |

CARL W. TOMLIN, Primary Examiner.

ANDREW R. JUHASZ, Examiner.